United States Patent [19]

Clonts

[11] 3,992,156
[45] Nov. 16, 1976

[54] MASS TRANSFER APPARATUS
[75] Inventor: Kenyon E. Clonts, Houston, Tex.
[73] Assignee: Merichem Company, Houston, Tex.
[22] Filed: July 23, 1975
[21] Appl. No.: 598,274

[52] U.S. Cl. ............................ 23/267 MS; 261/112; 208/263
[51] Int. Cl.² .................... B01D 11/04; B01F 3/04; B01F 3/08; C10G 17/00
[58] Field of Search ............ 23/267, 267 MS, 270.5; 261/112; 208/251, 263

[56] References Cited
UNITED STATES PATENTS

| | | | |
|---|---|---|---|
| 459,254 | 9/1891 | McAuley | 261/112 |
| 1,864,911 | 6/1932 | Jodeck | 23/267 MS |
| 2,054,809 | 9/1936 | Fleisher | 261/112 |
| 2,728,714 | 12/1955 | Winkler | 23/267 MS |
| 3,014,861 | 12/1961 | Buningh | 208/287 |
| 3,207,691 | 9/1965 | Mes | 208/288 |
| 3,496,996 | 2/1970 | Osdor | 23/270.5 T |
| 3,585,005 | 6/1971 | Coggan | 261/112 |
| 3,617,531 | 11/1971 | Schlicht | 208/263 |

FOREIGN PATENTS OR APPLICATIONS

| | | | |
|---|---|---|---|
| 618,045 | 4/1961 | Canada | 208/263 |
| 318,550 | 8/1969 | Sweden | 23/267 MS |

Primary Examiner—Stephen J. Emery
Attorney, Agent, or Firm—Kirby L. Boston

[57] ABSTRACT

Improved apparatus for effecting contact between first and second immiscible fluids in order to provide mass transfer therebetween including a conduit having a fiber bundle or a plurality of fiber sub-bundles secured or mounted therein, the fiber bundle or sub-bundles having a plurality of elongated support members positioned within the bundles for alleviating stress from the fibers within the bundle or sub-bundles.

21 Claims, 10 Drawing Figures

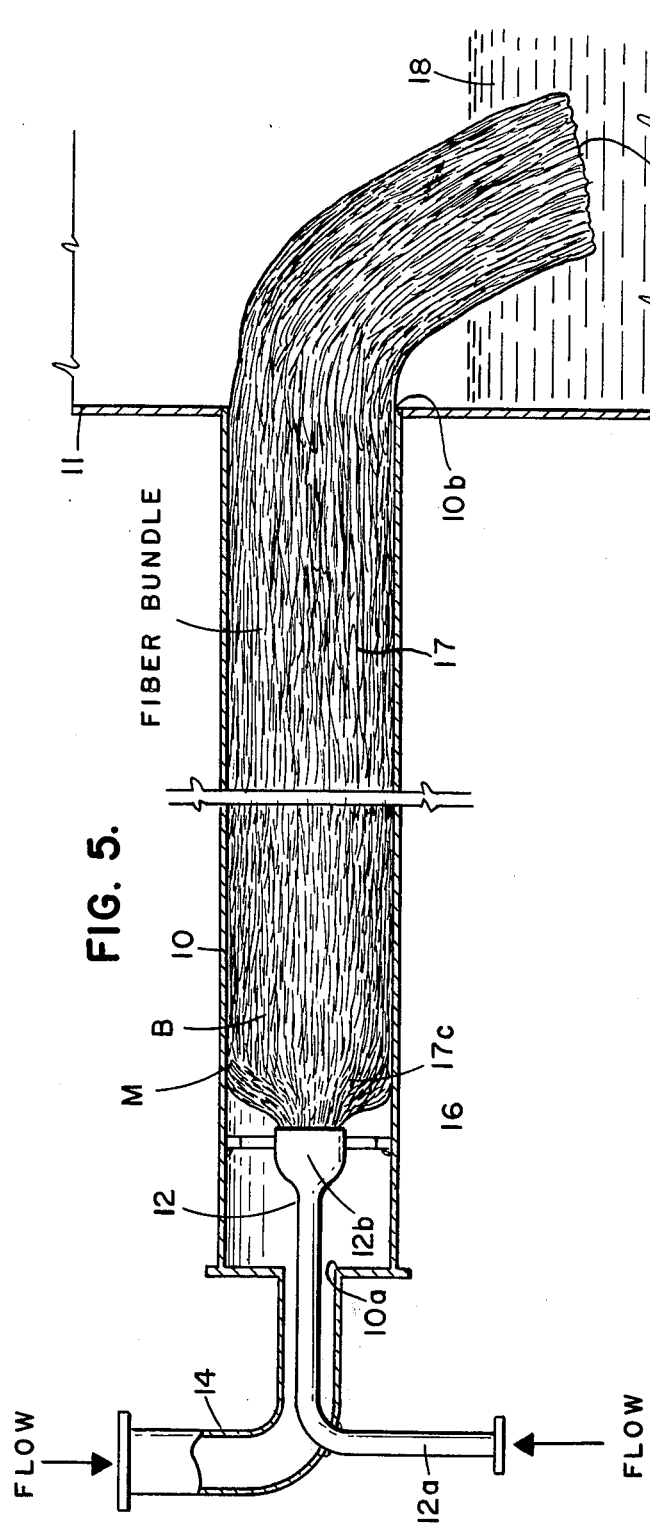
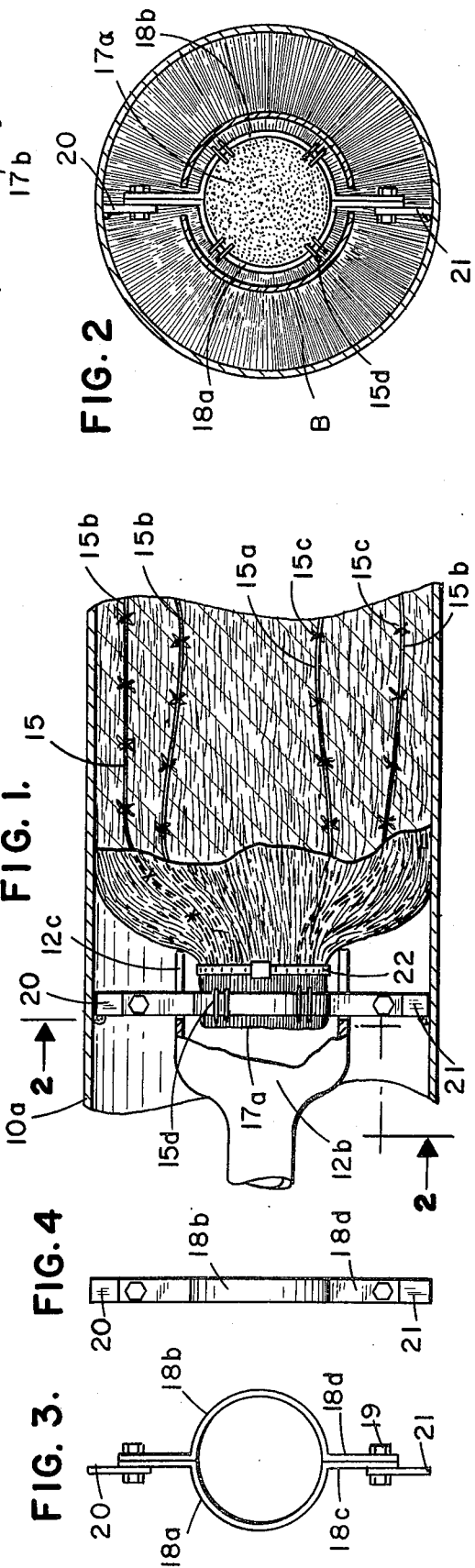

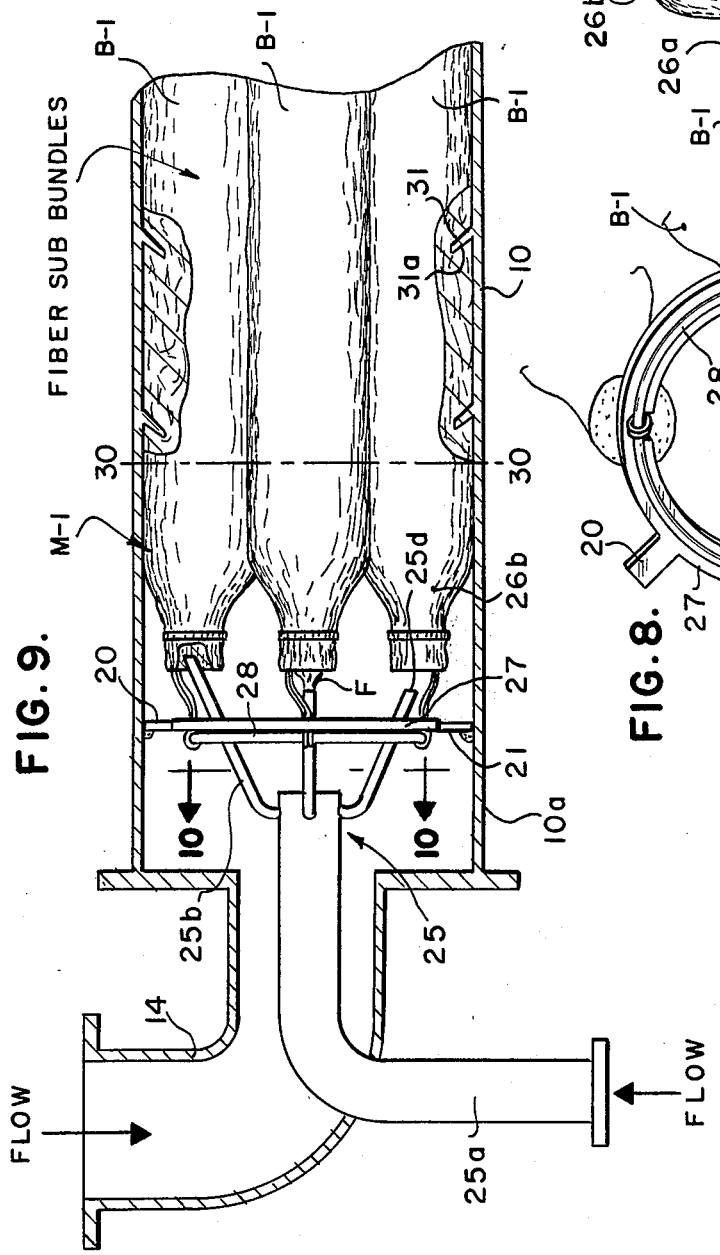
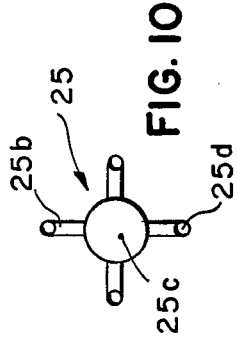
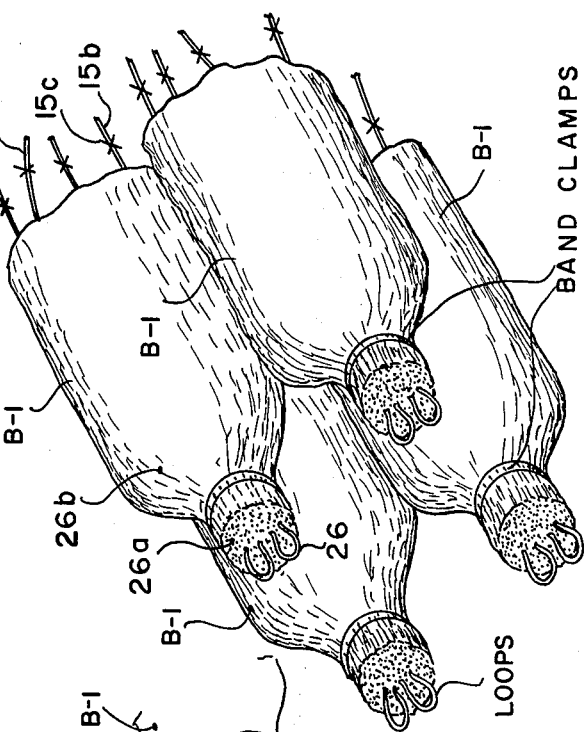
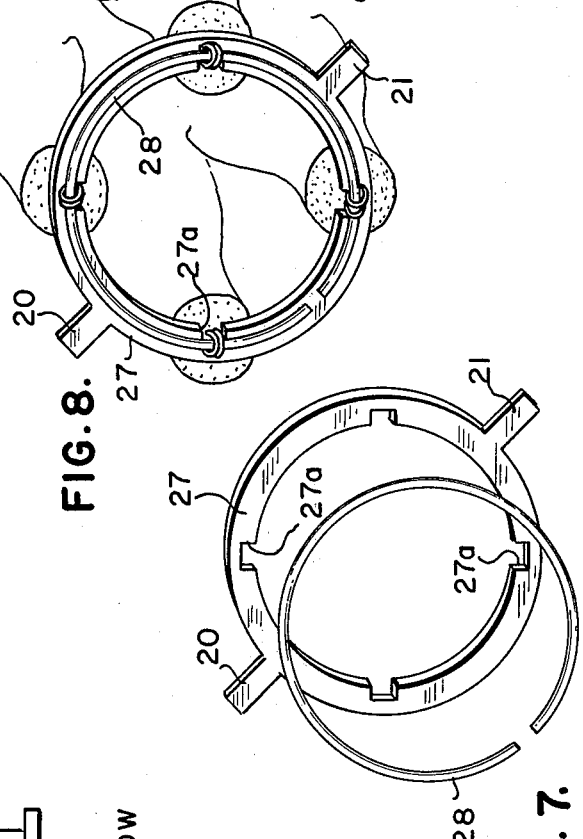

MASS TRANSFER APPARATUS

BACKGROUND OF THE INVENTION

The field of this invention is the effecting of mass transfer between two immiscible fluids.

U.S. Pat. Nos. 3,754,337 and 3,758,404 are directed to methods of effecting mass transfer between two immiscible fluids. U.S. Pat. No. 3,758,404 discloses a method for effecting mass transfer between immiscible, concurrently flowing liquid-liquid phases including a conduit having a bundle of elongated fibers positioned therein. The fiber bundle is positioned within the conduit at a perforated node that also acts as the point of introduction for the first liquid which is deposited onto the fiber within the fiber bundle as a film. A second liquid is directed into the conduit and over the first liquid deposited on the fibers. The large area of contact between the first and second liquids provides for an efficient mass transfer therebetween. The first liquid deposited upon the fibers is moved along the fibers by the viscous drag occurring between the two concurrently flowing fluids. The first liquid in film form, sometimes referred to as the constrained phase, is moved along the fibers and eventually deposited in a collection vessel. The downstream end of the fiber bundle extends outwardly of the conduit into the collection vessel for the purpose of making direct fluid contact with fluid collected off of the bundle in order to prevent dispersion between the two phases. In this manner, mass transfer is efficiently effected between the two immiscible liquids without dispersion of one liquid into the other. U.S. Pat. No. 3,747,377 provides for a gas-liquid mass transfer process which is similar to the liquid-liquid mass transfer process just described. These processes have proved to be remarkable inventions providing mass transfer at high efficiency levels without dispersion of one fluid into the other.

Significant problems have arisen in the initial practice of the invention set forth in these patents. For example, it has been discovered that the viscous drag occurring between the concurrently flowing first and second fluids exerts stress upon the individual fibers within the fiber bundle which can cause the fibers to break, particularly with certain fiber materials, such as stainless steel wool. The problem is compounded due to the length of the fibers and the fact that these stresses tend to increase with the length of the fibers.

SUMMARY OF THE INVENTION

A new and improved apparatus is provided for effecting contact between first and second immiscible fluids in order to provide for mass transfer therebetween. The new and improved apparatus of the preferred embodiment of this inventin includes a conduit having an inlet and an outlet, the conduit inlet being adapted to receive the second fluid and the conduit outlet being adapted for placement with a collection vessel. A fiber bundle is positioned within and extends generally along the conduit. The fiber bundle is formed of a plurality of generally linearly extending fibers which may be metallic or non-metallic fibers.

The fiber bundle has a downstream end that extends outwardly of the conduit outlet for making fluid connection with a layer of the first fluid in the collection vessel and an upstream end positioned within the conduit inlet. Bundle mount means secure the fiber bundle within the conduit and fluid distribution means are provided and are positioned for introducing the first fluid onto the upstream portion of the fibers comprising the bundle in a manner such that dispersion of the first fluid into the second is avoided. Stress alleviation means are positioned within and extend linearly along the conduit in operative engagement with the fiber bundle for transferring at least some of the stress exerted on the fibers from the fiber bundle, the stress being caused at least in part by the viscous drag exerted upon the surface of the stationary fibers by the concurrently flowing fluids.

In a preferred embodiment of this invention, the stress transfer means includes at least one elongated support member connected to the bundle mount means and extending generally along and within the fiber bundle. The elongated support member includes fiber support means for engaging at least some of the fibers within the fiber bundle for at least partly transferring stress from the fibers to a bundle mount member which mounts the bundle within the conduit. The fiber support means of the elongated support member includes an approximately transversely directed surface portion for engaging and transferring stress from the fibers within the bundle. Barbed wire is an example of one of such elongated support members which is capable of being positioned within the fiber bundle for transferring stress away from the fiber in the bundle and thus increasing the operating life of the bundle.

In a second preferred embodiment of this invention, an apparatus is provided which includes a plurality of sub-bundles mounted within the conduit instead of one bundle. The sub-bundles each have mounted therein stress transfer means similar to that already mentioned; and, the sub-bundles are connected to an annular mounting member positioned within the conduit for securing the bundles in position in the conduit. A fluid distribution means for distributing the first fluid along the fibers includes a plurality of distribution tubes positioned near the conduit entrance, the tubes being adapted to receive the first fluid. The distribution tube terminate sufficiently close to the upstream end of the fiber sub-bundles thereby enabling transfer without dispersion of the first fluid onto the upstream portion of the fibers of the sub-bundles. By "transfer without dispersion," in reference to the distribution means, is meant the movement of the first fluid in a cylinder-like stream from the end of the distribution tubes to the fiber bundle such that there is a continuous bridge of first liquid between each distribution tube and the upstream portion, generally the upstream end, of a sub-bundle.

It has further been discovered that there are certain minimum-maximum limits or ranges which should be placed on the various structural elements utilized in the practice of the process as set forth in the patents in order to obtain the desired results. For example, it has been found that the ratio of conduit length over diameter; the transverse, cross-sectional fill density of the fibers within the conduit; and, the fiber diameter all have an effective range of operation which must be adhered to in order to obtain desired results.

This summary of the invention is not inclusive of all the salient details and features of the invention described here but is only intended to give the reader a summary of some of the various features to be set out in detail below.

BRIEF DESCRIPTION OF THE DRAWINGS

FIG. 1 is a side view partly in section of one preferred embodiment of the apparatus of this invention utilizing a single fiber bundle;

FIG. 2 is a sectional view taken along line 2—2 of FIG. 1 illustrating the mounting of the bundle within the conduit;

FIGS. 3 and 4 are rear and side views, respectively, of the circular clamp used to secure the bundle within the conduit;

FIG. 5 is a side view at least partly in schematic form of one embodiment of the apparatus having the distribution cup mounted about the mounting clamps which secure the single bundle and further illustrating the downstream portion of the conduit, and bundle and their location with a collection vessel;

FIG. 6 is an isometric view of four sub-bundles to be mounted in the conduit in a second embodiment of this invention;

FIG. 7 is an isometric, assembly view of the mounting rings for mounting the sub-bundles;

FIG. 8 is an isometric view of the sub-bundles mounted onto the mounting rings;

FIG. 9 is a side view at least partly in schematic form of the sub-bundle structure and the fluid distribution tubes utilized to transfer the first fluid onto the fibers within the sub-bundles; and FIG. 10 is a sectional view taken along line 10—10 of FIG. 9.

DESCRIPTION OF THE PREFERRED EMBODIMENTS

Referring to the drawings and in particular to FIGS. 1–5, a mass transfer apparatus M is illustrated in various views. Generally, the mass transfer apparatus M includes a bundle B of elongated fibers mounted in a conduit 10. The conduit 10 has an outlet 10b that is adapted for connection or placement with a collection vessel 11. A fluid distribution means 12 is mounted at the conduit inlet 10a for distributing a first fluid from fluid line 12a onto the fibers within the bundle B. A second fluid line 14 is attached at the conduit inlet 10a for delivering a second fluid into the conduit inlet. And, stress transfer means generally designated as 15 is positioned within and linearly along the conduit 10 in operative engagement with the bundle B for alleviating at least some of the stress exerted on the bundle fibers, such stress being caused at least in part by the viscous drag between the concurrently flowing first and second fluids. U.S. Pat. Nos. 3,754,337 and 3,758,404 have been referred to as disclosing the process for providing sufficient surface area of the first fluid on the fibers in film form to effect mass transfer of a component between the first and second fluid as the second fluid is flowed over the first fluid. The improved mass transfer apparatus M of the embodiment of this invention illustrated in FIGS. 1–5 is a structural improvement over the structure disclosed in these patents.

Referring to FIG. 5, the conduit outlet 10b is illustrated as being attached directly to the collection vessel 11. It should be understood that it is within the scope of this invention to place the conduit 10 partly or entirely within the confines of the collection vessel 11.

The fiber bundle B is positioned within the conduit 10 and secured thereto by a bundle mount means generally designated as 16. The fiber bundle B is comprised of a plurality of elongated fibers 17 which are packed together and positioned within the conduit 10. The fiber bundle B may be defined as including an upstream end 17a and a downstream end 17b. The downstream end 17b of the bundle B extends outwardly of the conduit 10 and into collected first fluid 18 within the collection vessel 11. Of course, the collected first fluid 18 will be different in composition from first fluid introduced in line 12a due to the gain or loss of one or more components which were transferred. The positioning of the downstream end 17b of the bundle within the collected first fluid allows for transfer of the first fluid from the individual fibers into the collected first fluid without dispersion of the first fluid into the second fluid.

The second fluid is exited from the vessel 11 in any suitable manner. The conduit 10 is illustrated in FIGS. 1–5 as being in a horizontal position; it may also be positioned vertically for flowing the immiscible fluids from top to bottom. Moreover, for a horizontal application, if the specific gravity of the first fluid is less than that of the second fluid, the first fluid will be collected in a layer in an upper portion of the collection vessel and the downstream ends of the fibers will exit the conduit and be secured in an upward direction for contact with the first fluid layer. The downstream end 17b of the bundle B may be positioned at almost any position or angle with respect to the conduit outlet 10b in order to effect disengagement of the second fluid and the subsequent transfer of the first fluid from the fibers within the bundle B.

The fibers which make up the bundle B may be either metallic or non-metallic elongated fibers. The non-metallic elongated fibers may be glass, such as fiberglass, or may be an organic material. Examples of organic fibers which are suitably employed in the practice of this invention include rayon, nylon, polyesters, polyolefins and almost any other composition that can be formed into elongated fibers and packed into a bundle B.

The bundle mount means 16 includes opposing semi-circular clamp members 18a and 18b which include ear portions 18c and 18d that can be bolted together by bolts such as 19 for mounting the semi-circular clamp members about the upstream portion 17c of the bundle B. The joined semi-circular clamp members 18a and 18b are adapted for bolted connection to lugs 20 and 21 which are welded or otherwise connected to the inside wall of the conduit inlet 10a. In this manner, the semi-circular clamp members 18a and 18b serve to mount and secure the bundle B within the conduit 10.

The stress alleviation means 15 is formed of a plurality of elongated stress alleviation or distribution members or strands 15a which are positioned within and extend linearly along the conduit 10 with the fibers of the bundle B. The stress transfer members 15a are elongated support members which are connected to the bundle mounting rings 18a and 18b in order to further mount and secure the bundle B within the conduit 10. The stress transfer members 15a each include an elongated tension bearing strand 15b and a plurality of fiber support protrusions or nodes 15c for providing approximately transversely directed surface areas to engage at least part of the fibers within the bundle and transfer the stress exerted on the fibers to the tension bearing portion 15a, which in turn transfers the stress to the mounting rings 18a and 18b and thus to the conduit 10 itself.

It has been previously mentioned that the viscous drag exerted on the surface of the stationary fibers is caused by the concurrent flow of the fluids and produces a tensile stress in the fibers. The amount of such tensile stress would normally be proportional to the length of the fibers. Without provision for alleviating the applied tensile stress, it is possible for the applied tensile stress to reach a magnitude causing the fibers to fail and thus render the bundle at least partly inoperable. The stress transfer members 15a are provided to receive, distribute, transfer and otherwise alleviate stress within the fibers thus avoiding such a result.

In one embodiment of this invention, it has been found that barbed wire is an effective stress distribution member. However, it is within the scope of this invention to utilize any type of elongated stress distribution member that can be mounted within the bundle B and connected to the clamp members 18a and 18b in order to alleviate or transfer stress from the fibers. Other elongated stress distribution members are elongated band saw blades and coil springs. The stress distribution members 15a are attached to the semi-circular clamp members 18a and 18b. In the embodiment illustrated, the stress distribution members 15a are barbed wire and the ends 15d of the barbed wire are looped over the semi-circular clamp members 18a and 18b and secured thereto. In this manner, the stress distribution members 15a also serve to cooperate with the joined semi-circular clamp members 18a and 18b to actually mount and secure the entire bundle B within the conduit 10.

The fluid distribution means 12 for distributing the first film-forming fluid over the individual fibers within the bundle B includes a hollow, cup-shaped end portion 12b which may be integrally formed with the line 12a. The cup-shaped end portion 12b includes diametrically opposed slot portions 12c which are adapted to receive the corrected clamp ear portions 18c and 18d in order to position the cup about the upstream portion 17c of bundle B. The cup-shaped portion 12b serves to introduce the first fluid onto the upstream portion of the individual fibers thus enabling the first fluid to form a film on the fibers with the bundle B.

In operation and use of the improved mass transfer apparatus M, the plurality of stress transfer members or strands 15a are positioned within the fiber bundle B along with the fibers actually forming the bundle and at least the end portion 17c is packed together and clamped with a band 22. The end portion 15d of the strands 15a are looped over the semi-circular clamp members 18a and 18b and the semi-circular clamp members are bolted together. With fiber materials such as stainless steel wool, or similarly skived fibers, the bundle, prior to insertion into the conduit, is fluffed up to a size larger in cross section than the conduit into which it is to be positioned. A pulling device such as a "come-along" is generally used to pull the bundle B into the conduit 10. The clamp members 18a and 18b are then bolted to the lugs 20 and 21 and the bundle B is then fully secured for operation.

Referring now to FIGS. 6–10, a second preferred embodiment of an improved mass transfer apparatus is designated as M-1. The mass transfer apparatus M-1 is basically identical to the mass transfer apparatus M and the same numbers and letters will be used to describe the same structural elements wherever possible. In the mass transfer apparatus M-1, a plurality of sub-bundles B-1 are mounted within the conduit 10 for receiving the first fluid from a fluid distribution means designated generally by the number 25. The second fluid line 14 is connected to the conduit inlet 10a for introducing the second fluid into the conduit inlet.

The plurality of sub-bundles B-1 are basically similar to the larger unitary bundle B of the mass transfer apparatus M. Each sub-bundle B-1 is formed of the plurality of elongated fibers which has been previously defined. Stress alleviation means may again be generally designated by the number 15. The stress alleviation means 15 includes a plurality of elongated stress transfer members 15a having stress transfer or fiber support protrusions or nodes 15c for engaging and supporting fibers within the sub-bundles B-1 and transfer stress to the strand-like tension bearing portions 15b of the elongated members 15a. In the embodiment illustrated in FIGS. 6–10, the stress distribution members 15a are again barbed wire. However, in this embodiment, each strand of barbed wire is actually then doubled back providing two strands for packing within the sub-bundles B-1, and forming a connectable end portion 26 which extends out of the upstream end 26a of the upstream portion 26b of each sub-bundle B-1. In the embodiment illustrated in FIG. 6, each sub-bundle has four stress distribution members 15a thus forming two loops 26 which extend outwardly of the sub-bundle end portion 26a. Referring in particular to FIGS. 6–8, the four sub-bundles B-1 are placed ajdacent to each other and the loops 26 for each of the sets of stress distribution strands 15a are fitted into circumferentially spaced slots 27a on an annular restraint ring 27. A split tie ring 28 is then run through the loops 26 so that the sub-bundles B-1 are actually connected to the annular restraint ring 27 by the stress transfer strands 15a. The purpose and function of the stress alleviation members 15a is identical to that previously described with respect to the mass transfer apparatus M and all such comments regarding the description of the stress transfer members may be incorporated into this description for the improved apparatus M-1.

After the annular restraining ring 27 has been secured to the sub-bundles B-1 by the loops 26 and the split tie ring 28, a pulling device is used to pull the plurality of sub-bundles B-1 into the conduit 10, leaving the downstream ends of the bundles (not shown), but similar to the bundle downstream end 17b, extending outwardly of the conduit outlet 10b. The annular restraint ring 27 includes tab portions 27b which are bolted or otherwise connected to lugs such as 20 and 21 welded or otherwise attached within the conduit inlet 10a.

The fluid distribution means 25 includes a fluid line or pipe member 25a which extends into the second fluid line 14 and forms a plurality of spaced spider members or distribution tubes 25b, the ends of which terminate sufficiently close to or within the upstream end 26a of the fiber sub-bundles to enable transfer without dispersion of the first fluid onto the upstream portion 26b of the sub-bundles B-1. Referring in particular to FIG. 10, end 25c of pipe member 25a is capped so that the first fluid is distributed only through the distribution tubes 25b. The number of tubes 25b is equal to the number of sub-bundles B-1. In FIG. 9, the distribution tubes 25b are shown extending through the annular ring 27 and terminating in a position just upstream of the upstream end 26a of the fiber sub-bundle. Thus, the end 25d of each distribution tube 25b is sufficiently close to the upsteam end 26a of each sub-bundle B-1 to enable transfer of the first fluid onto each sub-bundle B-1 without dispersion. By transfer without dispersion is meant ejecting the first fluid from the tube ends 25d in a cylinder-like stream F which actually bridges the distance between the tube ends 25b and the upsteam end of the bundle 26a such that the first fluid is transferred onto the fibers within the sub-bundles B-1 whereupon a film is formed on the surface of the fibers. The distribution tubes 25b can also terminate within the upstream portion 26b within the fiber sub-bundle. This mode is illustrated by the top tube 25b in FIG. 9.

Under operating conditions, it has been discovered that there are certain limiting parameters which are important to the effective operation of either of the mass transfer apparatuses M or M-1. Referring first to the configuration of the fiber bundle or plurality of fiber sub-bundles, it had been found desirable to confine the length to diameter (L/D) ratio of the overall bundle assembly to a L/D ratio within a range of from about 3 to about 30. With a L/D ratio of less than about 3, there is generally insufficient residence time of the fluids within the bundle to achieve sufficient mass transfer and at a L/D ratio greater than about 30, there are generally pressure drop problems and mechanical problems associated with insertion of the bundle assembly into the conduit. A still more preferred L/D ratio is one within the range of from about 5 to about 15.

It has further been found desirable to confine the fill density to a particular range. Fill density is herein defined as being the ratio of the sum of the transverse, cross-sectional areas of all the individual fibers taken along a line parallel to 30—30 divided by the internal transverse, cross-sectional area of the conduit along the same line and is expressed as percent. The range of effective fill densities is determined by considering the mass transfer requirements and the pressure drop considerations for the system. These characteristics are in turn determined by fiber diameter, relative straightness or configuration of the fibers in the fiber bundle, and the specific gravity and viscosity of each of the fluids. Generally, the fill density must be from about 0.25 to about 15 percent with a fill density of from about 1.0 to about 5.0 percent being preferred. With a fill density greater than about 15 percent, which is generally possible only with larger diameter fibers, the surface area available for mass transfer is generally insufficient, whereas with fill density of less than about 0.25 percent, the fibers of the fiber bundle sag so that the fibers do not substantially uniformly fill the cross section of at least a portion of the conduit.

With respect to fiber diameter, it has been found that the effective range of operation is from a minimum of about 3 microns to a maximum of about 2,500 microns (approximately 0.1 inches). The range of effective fiber diameters is determined in part by the nature of the fiber, including the strength of the fiber and its relative straightness or configuration. For example, with metallic fibers such as stainless steel wool, a preferred fiber diameter is within the range of from about 15 to about 200 microns. A fiber diameter may be selected so as to achieve a certain fill density for a particular process application. Generally a larger fiber diameter requires a higher fill density in order to provide sufficient surface area for mass transfer. On the other hand, extremely small fibers do not have the structural rigidity to remain substantially uniformly distributed across the conduit cross section.

EXAMPLE

A conduit 10 having an inner diameter of 14 inches and being 8 feet in length has mounted therein an 8 foot bundle which has a downstream end portion extending outwardly of the conduit 10. The first fluid distribution means included a distributor cup 12b having a 6-inch diameter and the first fluid which was distributed through this cup was a 25% wt. caustic soda solution. The fiber was type 430 stainless steel (stainless steel wool) and had an average fiber diameter of 65 microns. The transverse, cross-sectional fill density of the fiber bundle as contained within the conduit was 1.5 percent.

The caustic was flowed outwardly through the caustic distributor cup at a rate of 450 barrels per day. The caustic had a 1.2 specific gravity and a viscosity expressed in centipoise in the range of 5–17. The second fluid line 14 received a hydrocarbon naphtha stream at a rate of approximately 10,000 barrels per day. The hydrocarbon fluid had a specific gravity of 0.76 and a viscosity expressed in centipoise of 0.5. The liquid temperatures were in a range of 100°–105° F. Approximately 70–80 percent of the undesirable mercaptans and other acidic components were transferred out from the hydrocarbon stream to the caustic.

The foregoing disclosure and description of the invention are illustrative and explanatory thereof, and various changes in the size, shape and materials as well as in the details of the illustrated construction may be made without departing from the spirit of the invention. For example, the stress alleviation means 15 may be a plurality of lugs or studs 31 which are attached to the inside of the conduit and extend inwardly at an angle toward the conduit inlet 10a. The lugs provide an approximately transverse surface portion 31a for engaging and supporting the fibers within the sub-bundles B-1 or the bundles B.

I claim:
1. In an apparatus for effecting contact between a liquid and a fluid immiscible with said liquid in order to enable mass transfer theretween, comprising:
    a conduit having an inlet and an outlet, said conduit inlet being adapted to receive said fluid and said conduit outlet being adapted for placement with a collection vessel;
    a fiber bundle positioned longitudinally within said conduit, said fiber bundle containing a plurality of generally linearly extending fibers having a downstream end extending outwardly of the end of said conduit outlet for making connection with a layer of said liquid in said collection vessel and an upstream end positioned within said conduit;
    bundle mount means securing the upstream portion of said fiber bundle within said conduit;
    and liquid distribution means positioned sufficiently close to said upstream end of the fiber bundle for transferring without dispersion said liquid onto the upstream end of said bundle whereby said liquid forms a film over the surface of the fibers enabling contact with the fluid over sufficient surface area within said bundle to provide for mass transfer therebetween;
    the improvement comprising stress alleviation means positioned within and linearly along said conduit in operative engagement with said fiber bundle for alleviating at least some of the stress exerted on the fibers in said fiber bundle, said stress alleviation means including at least one elongated support member extending generally along and within said fiber bundle, said elongated support member including fiber support means for engaging at least some of said fibers within said fiber bundle and at least partly transferring stress from said fibers to said bundle mount member.

2. The structure set forth in claim 1, including:
means attaching said elongated support member to said bundle mount member in order to secure said bundle to said conduit.

3. The structure set forth in claim 1, wherein:
said fiber support means includes at least one approximately transversely directed surface portion for engaging and transferring stress from said fibers within said bundle.

4. The structure set forth in claim 1, wherein:
said elongated support member is barbed wire.

5. The structure set forth in claim 1, including:
said bundle mount member includes first and second semi-circular bracket portions mounted over said upstream portion of said fibers in said fiber bundle.

6. The structure set forth in claim 1, wherein:
said liquid distribution means having a cup-shaped, hollow end portion mounted about said upstream portion of said bundle for transferring said liquid onto the upstream portion of said fibers.

7. The structure set forth in claim 1, wherein:
the ratio of conduit length to conduit internal diameter is in the range from about 3 to about 30.

8. The structure set forth in claim 1, wherein:
said fiber bundle comprises fibers in an amount such that the transverse cross-sectional fill density is in the range from about 0.25 to about 15 percent.

9. The structure set forth in claim 1, wherein:
said fiber diameter is in the range from about 3 to about 2500 microns.

10. The structure set forth in claim 1, wherein said stress alleviation means includes:
a plurality of studs mounted on the inside of said conduit and extending generally radially inwardly to engage and support the fibers within said bundle.

11. Apparatus for effecting contact between a liquid and a fluid immiscible with said liquid in order to enable mass transfer therebetween, comprising:
a conduit having an inlet and an outlet, said conduit inlet being adapted to receive said fluid and said conduit outlet being adapted for placement with a collection vessel;
a plurality of fiber sub-bundles positioned longitudinally within said conduit, each of said sub-bundles containing a plurality of generally linearly extending fibers having a downstream end extending outwardly of said conduit outlet for making connection with a layer of said liquid in said collection vessel and an upstream end positioned within said conduit;
bundle mount means securing said upstream portion of each sub-bundle within said conduit;
liquid distribution means positioned sufficiently close to said upstream end of the fiber bundle for transferring without dispersion said liquid onto the upstream portion of each sub-bundle whereby said liquid forms a film over the surface of the fibers enabling contact with the fluid over sufficient surface area within said bundle to provide for mass transfer therebetween; and
stress alleviation means positioned within and linearly along said conduit in operative engagement with said sub-bundles for alleviating at least some of the stress exerted on the fibers in said fiber sub-bundles, said stress alleviation means including at least one elongated support member extending generally along and within each of said fiber sub-bundles, said elongated support member including fiber support means for engaging said fibers within each of said fiber sub-bundles and at least partly transferring stress from said fiber bundle to said bundle mount member.

12. The structure set forth in claim 11, including:
means attaching each of said elongated support members to said bundle mount member in order to secure each of said sub-bundles to said conduit.

13. The structure set forth in claim 11, wherein:
said fiber support means includes at least one approximately transversely directed surface portion for engaging and transferring stresses from said fibers within each of said sub-bundles.

14. The structure set forth in claim 11, wherein:
said elongated support member is barbed wire.

15. The structure set forth in claim 13, including:
an annular restraint ring attachable to said conduit and a tie ring positionable to extend through looped portions of said elongated support member for attaching said sub-bundles to said restraint ring.

16. The structure set forth in claim 11, wherein said fluid distribution means includes:
a plurality of distribution tubes positioned in said conduit and being adapted to receive the liquid, said distribution tubes corresponding in number to the number of sub-bundles and having a downstream end terminating sufficiently close to said upstream end of said sub-bundles for transferring without dispersion said liquid onto the upstream end of said fibers.

17. The structure set forth in claim 11, including:
a plurality of distribution tubes positioned in said conduit and being adapted to receive said liquid said distribution tubes corresponding in number to the number of sub-bundles and having a downstream end terminating within said sub-bundle near the upstream end of said sub-bundle for transferring without dispersion said liquid onto the upstream portion of said sub-bundle.

18. The structure set forth in claim 11, wherein:
the ratio of conduit length to conduit internal diameter is in the range from about 3 to about 30.

19. The structure set forth in claim 11, wherein:
said fiber bundle comprises fibers in an amount such that the transverse cross-sectional fill density is in the range from about 0.25 to about 15 percent.

20. The structure set forth in claim 11, wherein:
said fiber diameter is in the range from about 3 to about 2500 microns.

21. The structure set forth in claim 11, wherein said stress alleviation means includes:
a plurality of studs mounted on the inside of said conduit and extending generally radially inwardly to engage and support the fibers within said sub-bundle.

* * * * *